(12) United States Patent
Kukuk et al.

(10) Patent No.: US 12,221,180 B2
(45) Date of Patent: Feb. 11, 2025

(54) TRACK TENSIONING SYSTEM

(71) Applicant: The Charles Machine Works, Inc., Perry, OK (US)

(72) Inventors: Brant Douglas Kukuk, Perry, OK (US); Victor L. Schmidlkofer, Perry, OK (US); Lelan Mack Powers, Stillwater, OK (US)

(73) Assignee: The Charles Machine Works, Inc., Perry, OK (US)

( * ) Notice: Subject to any disclaimer, the term of this patent is extended or adjusted under 35 U.S.C. 154(b) by 642 days.

(21) Appl. No.: 17/502,725

(22) Filed: Oct. 15, 2021

(65) Prior Publication Data

US 2022/0119052 A1    Apr. 21, 2022

Related U.S. Application Data

(60) Provisional application No. 63/092,550, filed on Oct. 16, 2020.

(51) Int. Cl.
*B62D 55/30* (2006.01)
*B62D 55/06* (2006.01)
*B62D 55/10* (2006.01)

(52) U.S. Cl.
CPC ............. *B62D 55/30* (2013.01); *B62D 55/06* (2013.01); *B62D 55/10* (2013.01)

(58) Field of Classification Search
CPC ......... B62D 55/30; B62D 55/10; B62D 55/06
See application file for complete search history.

(56) References Cited

U.S. PATENT DOCUMENTS

| | | | | |
|---|---|---|---|---|
| 3,156,505 | A * | 11/1964 | Hubert | B62D 55/14 384/418 |
| 4,854,650 | A * | 8/1989 | Getz | B62D 55/30 305/148 |
| 6,001,036 | A * | 12/1999 | O'Brien | B62D 55/30 305/146 |
| 8,240,783 | B2 | 8/2012 | Johnson et al. | |
| 8,556,354 | B2 | 10/2013 | Johnson et al. | |
| 10,435,092 | B2 * | 10/2019 | Stellman | B62D 55/08 |
| 10,793,210 | B2 * | 10/2020 | Roske | B62D 55/06 |
| 2016/0311481 | A1 * | 10/2016 | Grant | B62D 55/30 |

* cited by examiner

*Primary Examiner* — Jason R Bellinger
(74) *Attorney, Agent, or Firm* — Tomlinson McKinstry, P.C.

(57) ABSTRACT

A track tensioning system configured to automatically adjust and maintain tension on an endless track used in a track assembly. Tension is applied to the track by pressure applied by one of the rollers included in the track assembly. The roller is movable relative to the other components of the track assembly using a linear actuator. Power is supplied to the linear actuator via a power source. The power source is configured to regulate the amount of power supplied to the linear actuator to maintain the track assembly at a desired track tension.

17 Claims, 11 Drawing Sheets

TRACK TENSIONING SYSTEM

RELATED APPLICATIONS

This application claims the benefit of provisional patent application Ser. No. 63/092,550, authored by KuKuk, and filed on Oct. 16, 2020, the entire contents of which are incorporated herein by reference.

SUMMARY

The present application discloses an apparatus comprising a work machine supported on a pair of track assemblies. Each track assembly comprises a first frame assembly supporting a first roller, and a second frame assembly supporting a second roller and movable relative to the first frame assembly. Each track assembly further comprises an endless track surrounding the first and second frame assemblies and engaging the first and second rollers, and a linear actuator engaging the first and second frame assemblies and configured to receive hydraulic fluid.

The work machine further comprises a hydraulic manifold supported on the work machine and in fluid communication with the linear actuator and a hydraulic pump. The hydraulic manifold comprises a valve configured to supply fluid from the pump to the linear actuator at a desired flow rate to maintain the fluid within the linear actuator at a desired pressure.

The present application further discloses a track assembly comprising a first frame assembly supporting a first roller, and a second frame assembly supporting a second roller and movable relative to the first frame assembly. The track assembly further comprises an endless track surrounding the first and second frame assemblies and engaging the first and second rollers, and a linear actuator engaging the first and second frame assemblies.

The linear actuator is configured to communicate with a power source. The power source is configured to manipulate the amount of power supplied to the linear actuator to maintain the linear actuator at a set position while the track assembly is in motion.

DETAILED DESCRIPTION

Figure 1:
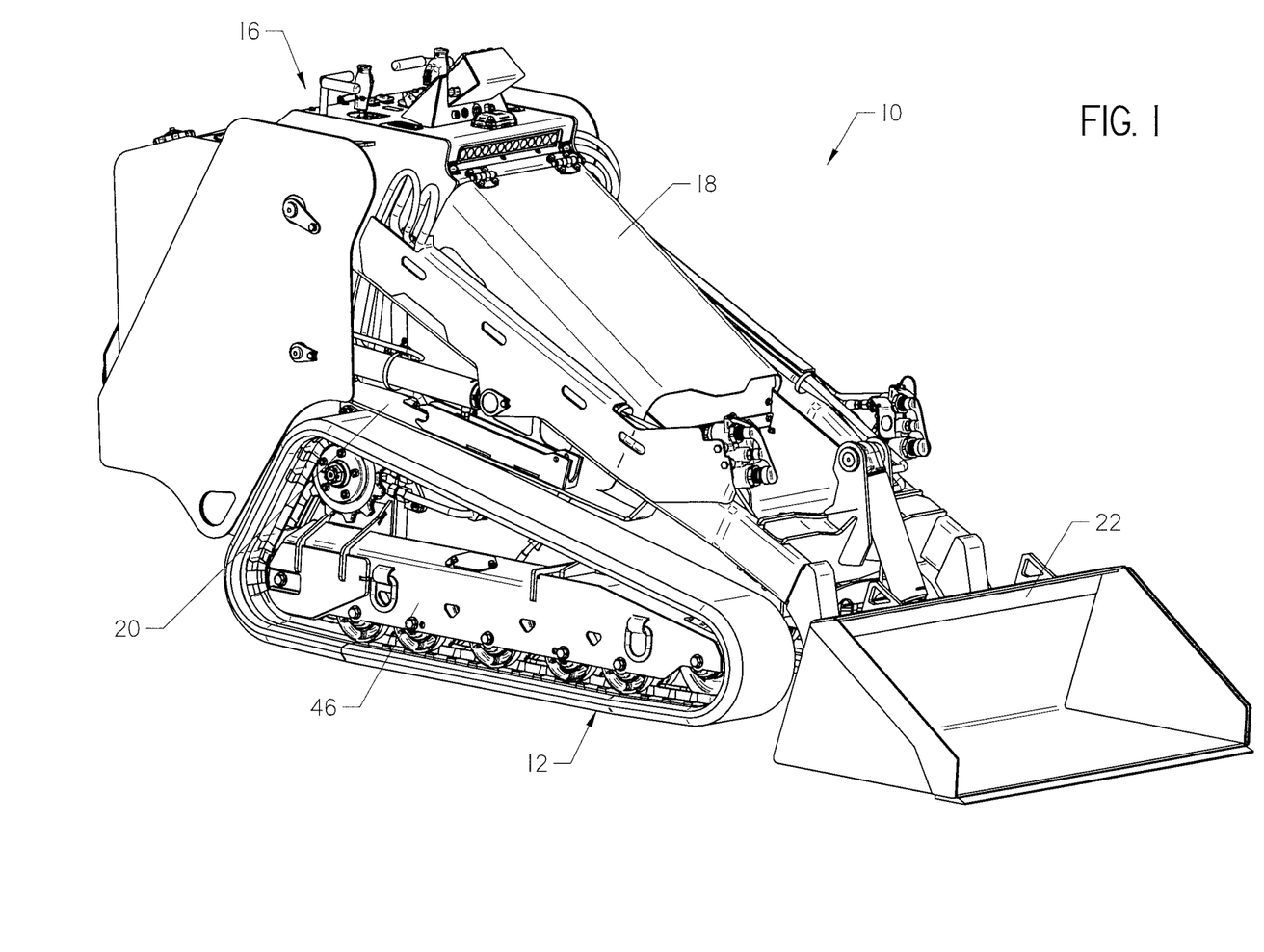
FIG. 1 is a side perspective view of a work machine supported on one embodiment of a pair of track assemblies.
Figure 9:
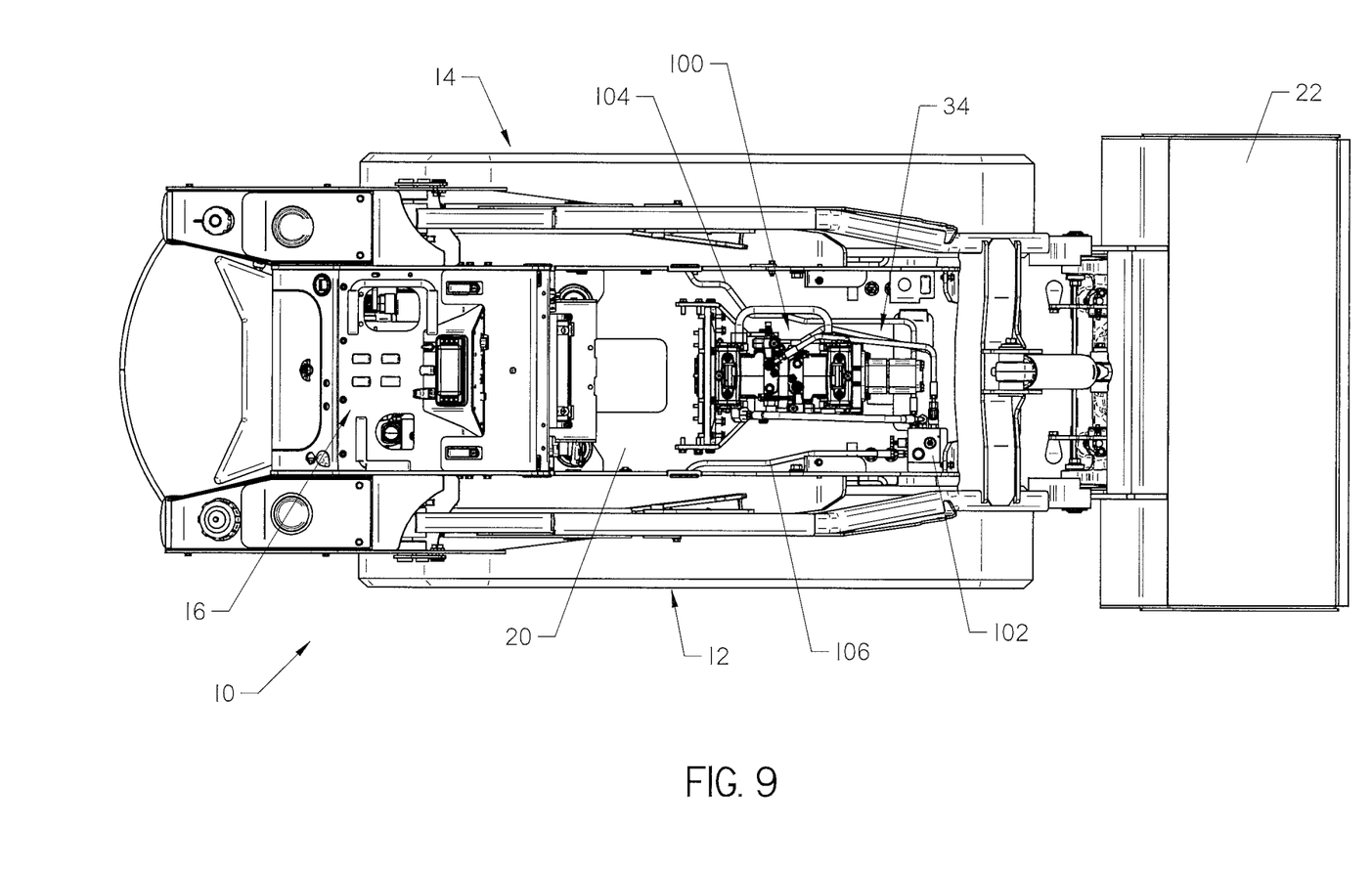
FIG. 9 is a top plan view of the work machine shown in FIG. 1, with the engine cover removed.

With reference to FIG. 1, one embodiment of a work machine 10 is shown. The work machine 10 is propelled by a pair of parallel track assemblies 12 and 14, as shown in FIGS. 1 and 9. Many work machines, like the work machine 10, use continuous track systems, such as the track assemblies 12 and 14, for propulsion. To reduce the risk of the track slipping from the track frame or excessive wear in the system, a proper amount of tension should be maintained on the track.

Commonly, track tensioning systems consist of a lead screw or grease-type cylinder in combination with a coiled spring. One example of a track tensioning system is disclosed in U.S. Pat. No. 10,435,092, issued to Stellman. These types of systems require regular operator maintenance via manual adjustments of the track tensioning system.

The present disclosure provides a track tensioning system that does not require manual adjustments by the operator. Instead, the track tensioning system utilizes a linear actuator connected to a power source that is configured to automatically adjust tension on the track, as needed. For example, in one embodiment the track tensioning system utilizes a single acting hydraulic cylinder within a closed loop hydraulic system.

The work machine 10 shown in FIG. 1 is a skid steer. In alternative embodiments, the track tensioning system disclosed herein may be used with any type of tracked vehicle or work machine. For example, the track tensioning system could be used with a tracked bulldozer, tractor, boom lift, etc.

Continuing with FIG. 1, the work machine to comprises an operator station 16 and engine compartment 18 supported on the frame 20. The track assemblies 12 and 14 are supported in a parallel relationship on opposite sides of the frame 20. A work tool 22 is supported on a front end of the work machine 10. The work tool 22 shown in FIG. 1 is a skid steer bucket.

The inner components of the track assemblies 12 and 14 may be shielded from outside air and debris by one or more covers 46, as shown in FIG. 1. The track assembly 14, shown in FIG. 9, is identical to the track assembly 12 being described specifically herein. The inner components of the track assembly 12 may be referred to as the "right" components, while the identical components in the track assembly 14 may be referred to as the "left" components.

Figure 2:
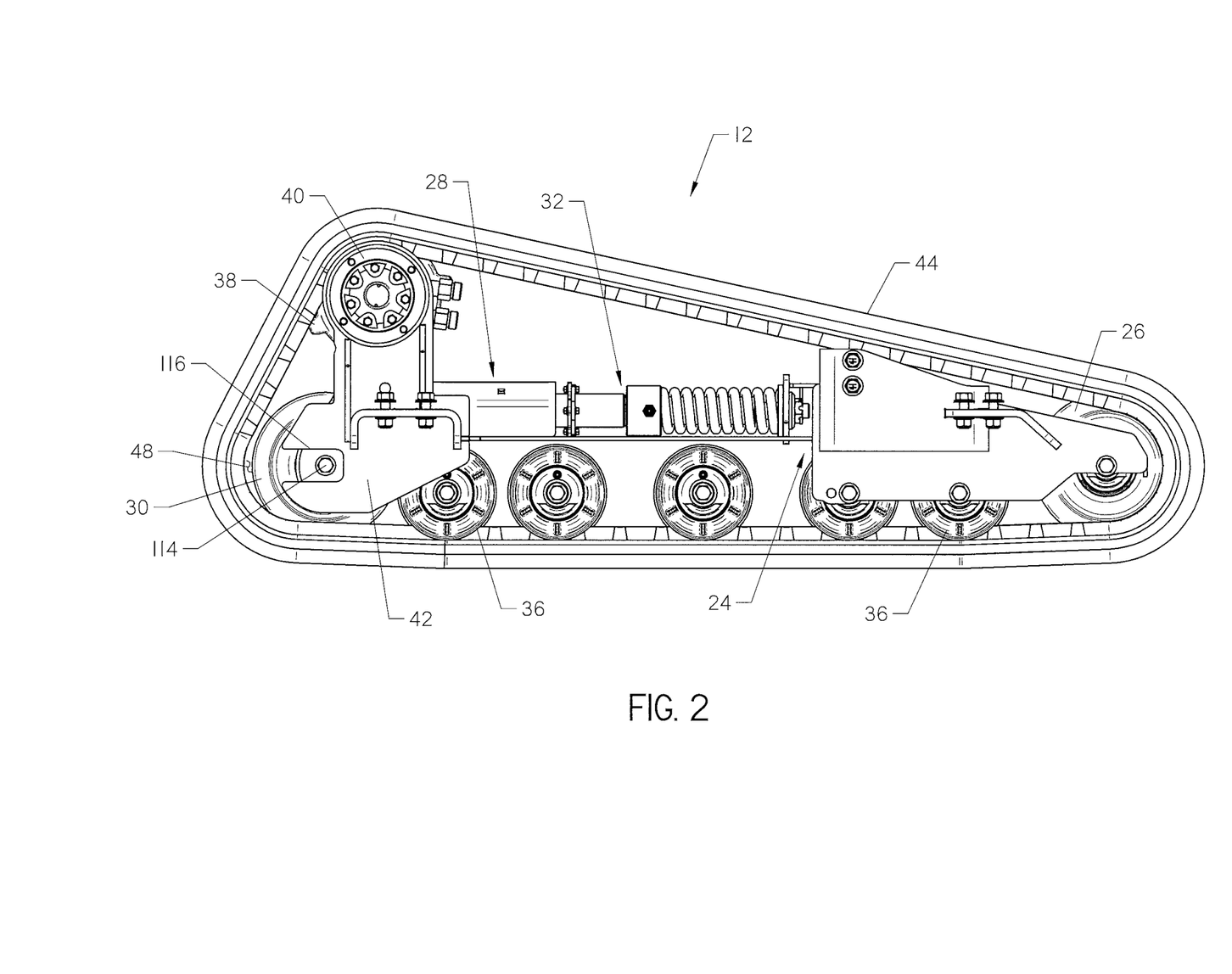
FIG. 2 is a side elevational view of the track assembly shown in FIG. 1. A cover included in the track assembly has been removed to expose the inner components, and the rear roller is shown spaced from the track.
Figure 3:
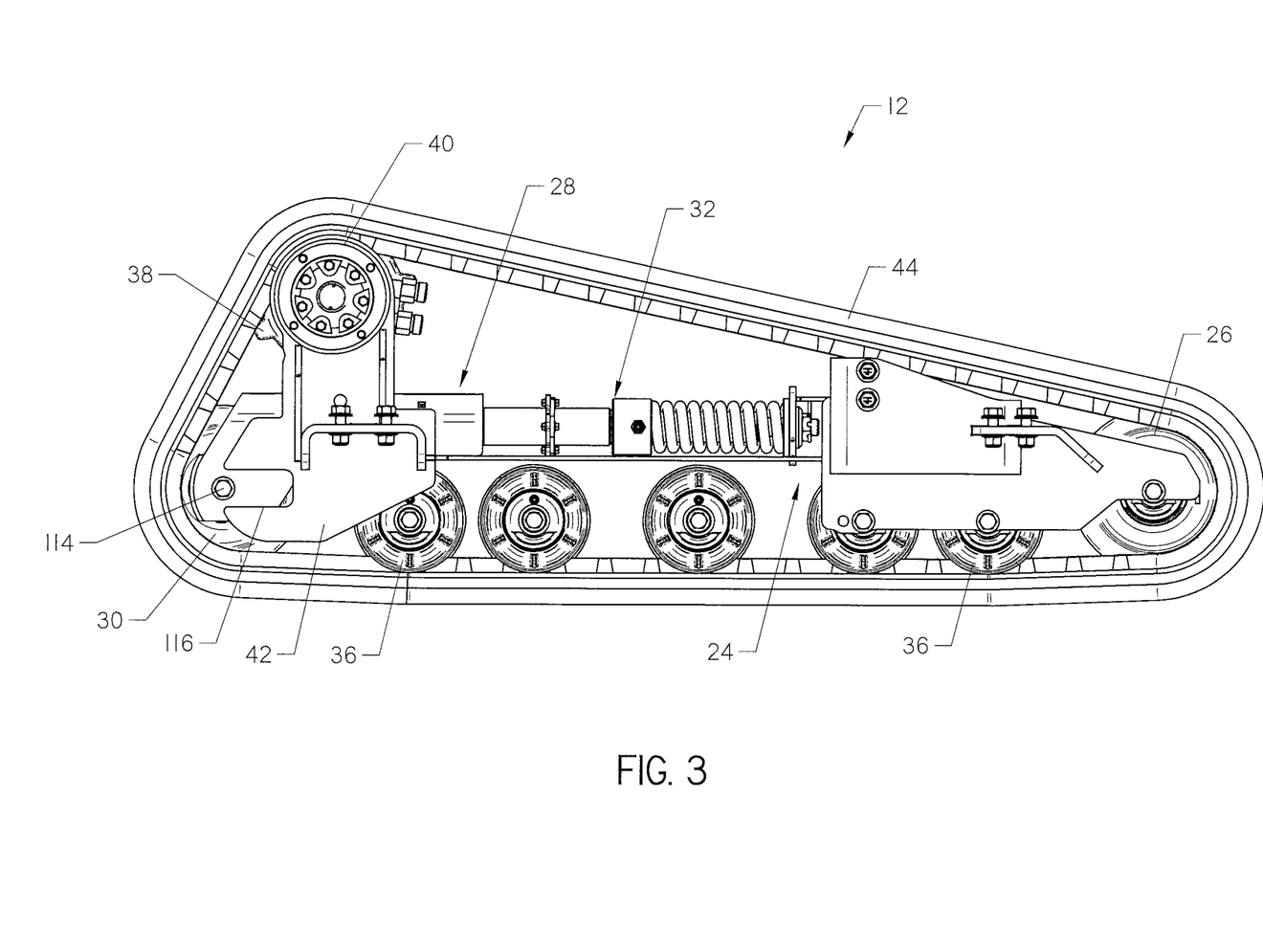
FIG. 3 is the side elevational view of the track assembly shown in FIG. 2, but the rear roller has moved rearwardly to engage the track.
Figure 10:
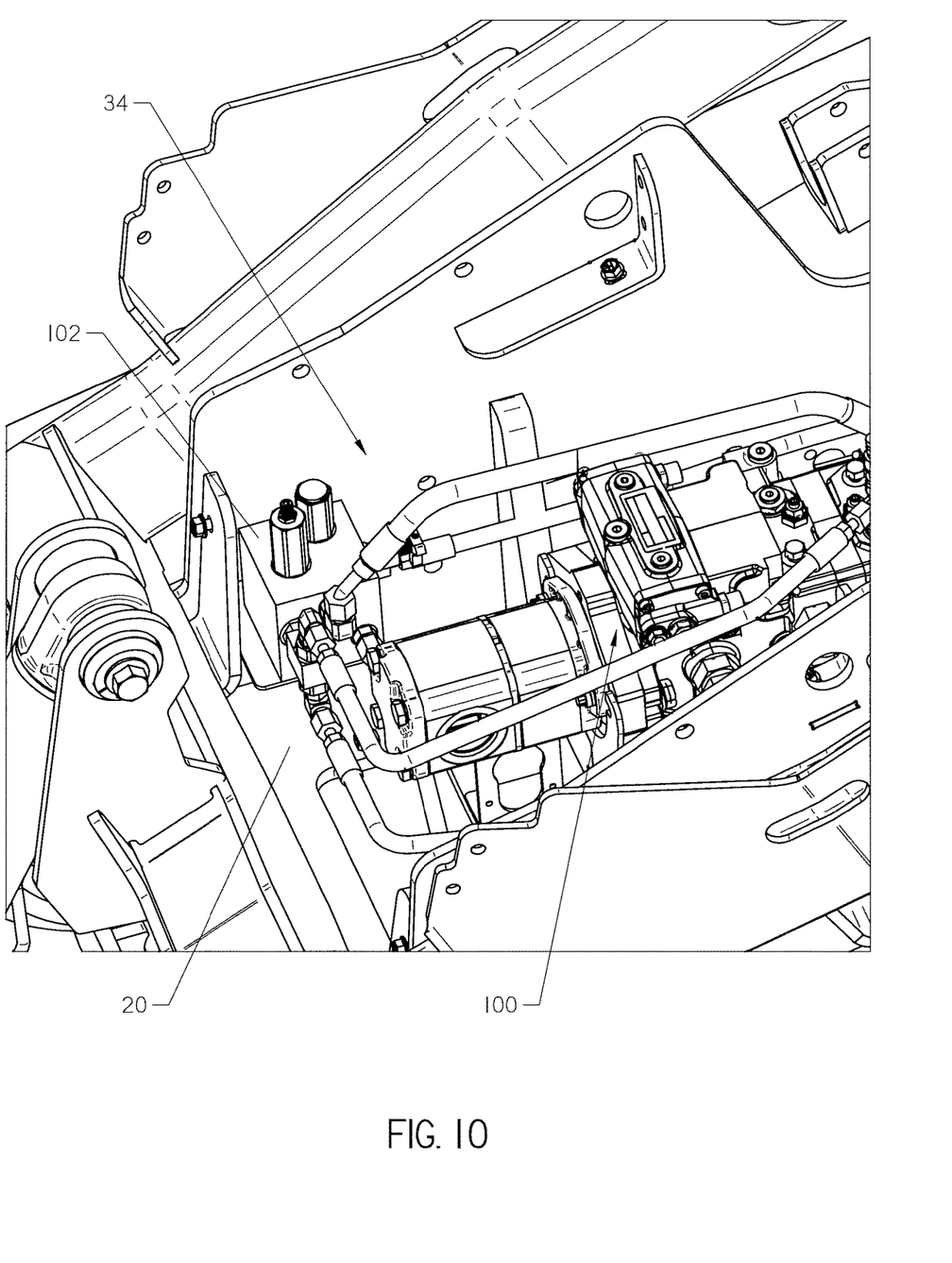
FIG. 10 is an enlarged and perspective view of the inner components of the work machine shown in FIG. 9.

With reference to FIGS. 2 and 3, the track assembly 12 comprises a first frame assembly 24 supporting a front roller 26, and a second frame assembly 28 supporting a rear roller 30. As will be described herein, a linear actuator 32 moves the second frame assembly 28 relative to the first frame assembly 24. The linear actuator 32 is powered by a power source 34 supported on the frame 20, as shown in FIG. 10.

The linear actuator 32 shown in FIGS. 2-8 is a hydraulic cylinder powered by a hydraulic power source. In alternative embodiments, the linear actuator 32 may be an electric linear actuator powered by a battery or other power supply. In further alternative embodiments, the linear actuator 32 may be a pneumatic linear actuator powered by a pneumatic air supply.

Continuing with FIGS. 2 and 3, the track assembly 12 further comprises a plurality of inner or bogie rollers 36 and a drive sprocket 38 powered by a motor 40. The inner rollers 36 are supported on the first frame assembly 24 and are positioned between the front and rear rollers 26 and 30. The front and rear rollers 26 and 30 may have a greater outer diameter than the inner rollers 36, as shown in FIG. 2. Five pairs of inner rollers 36 are shown in FIGS. 2 and 3, however more or less rollers may be used. A motor bracket 42 attached to the first frame assembly 24 supports the motor 40 and the sprocket 38 above the frame assemblies 24 and 28. The motor 40 shown in FIGS. 2 and 3 is a hydraulic motor. In alternative embodiments, the motor 40 may be electrically powered.

An endless track 44 surrounds the first and second frame assemblies 24 and 28 and engages the sprocket 38 and the rollers 26, 30, and 36. One embodiment of an endless track is described in U.S. Pat. No. 10,099,733, issued to Sewell, the entire contents of which are incorporated herein by reference. The endless track 44 may be made of a durable rubber or other flexible material. An outside surface of the track 44 is treaded while the inner surface may comprise one or more circumferential channels for the rollers 26, 30, and 36 to sit within.

During operation, torque is transferred to the sprocket 38 from the motor 40. In response, the sprocket 38 drives the track 44 around the frame assemblies 24 and 26. The rollers 26, 30, and 36 apply tension on the track 44 as well as help guide the track 44 around the frame assemblies 24 and 28. The amount of tension applied to the track 44 by the rear and front rollers 26 and 30 may decrease during operation, as shown for example by a space 48 between the rear roller 28 and the track 44 in FIG. 2. The linear actuator 32 is configured to move the second frame assembly 28 rearwardly, such that the rear roller 30 applies tension to the track 44, as shown in FIG. 3.

Turning to FIGS. 4-7, the first frame assembly 24 comprises a base frame 50 that supports one or more side plates 52. The base frame 50 extends between the rear and front rollers 26 and 30. The front roller 26 is attached to one of the side plates 52. In alternative embodiments, the front roller 26 may be attached directly to the base plate 50. The first frame assembly 24 further comprises a tension plate 54. The tension plate 54 is rigidly attached to the base plate 50 at a right angle. As will be described herein, the tension plate 54 engages the linear actuator 32.

Figure 4:
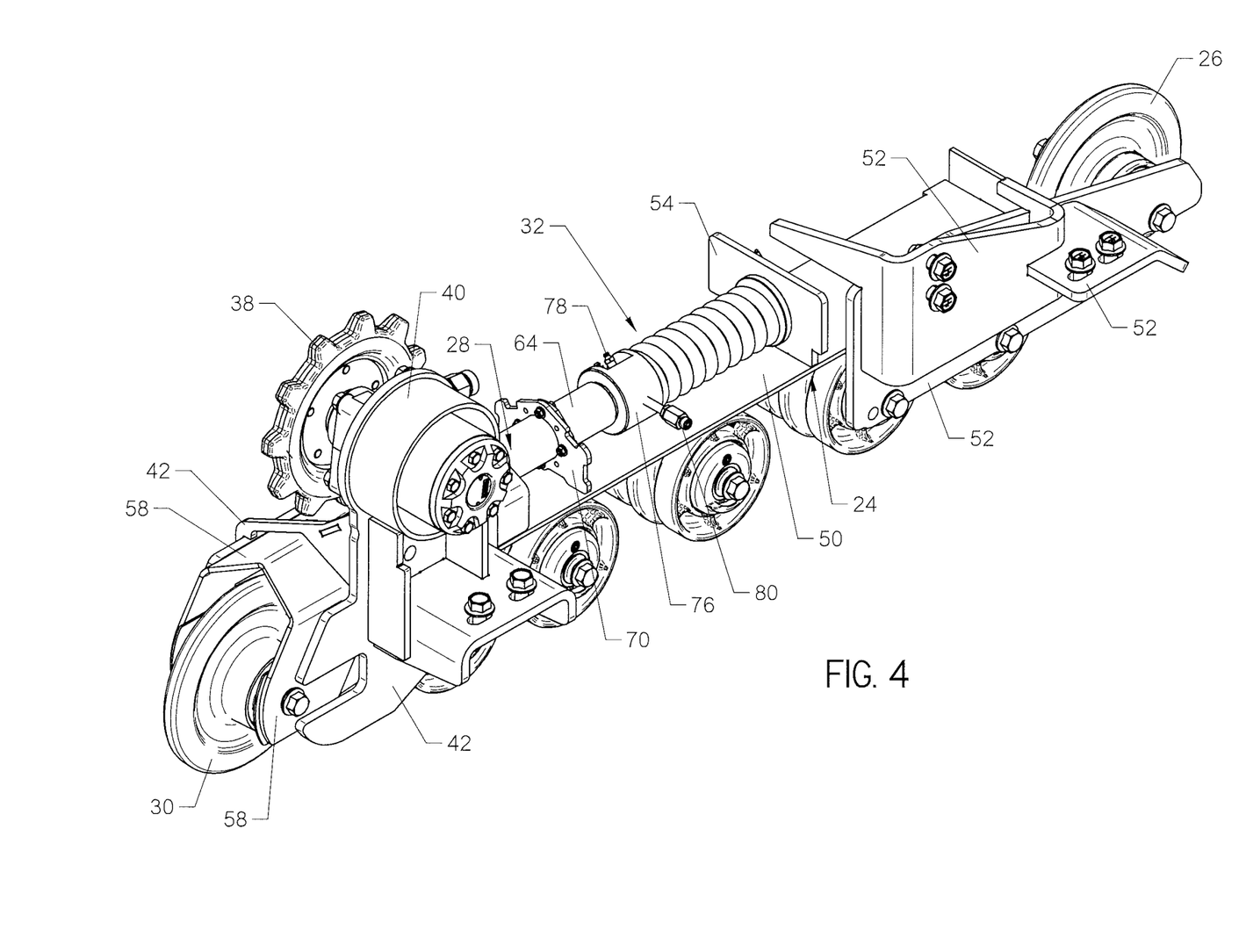
FIG. 4 is a rear perspective view of the inner components of the track assembly shown in FIG. 2.
Figure 5:
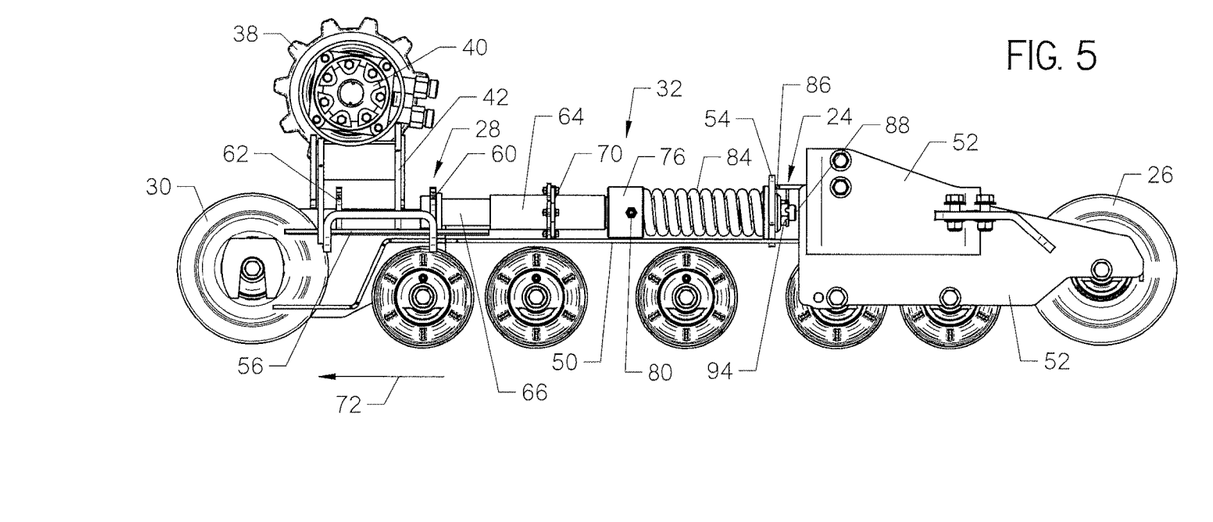
FIG. 5 is a side elevational view of the inner components of the track assembly shown in FIG. 3. Portions of the frames included in the track assembly have been removed for clarity.
Figure 6:
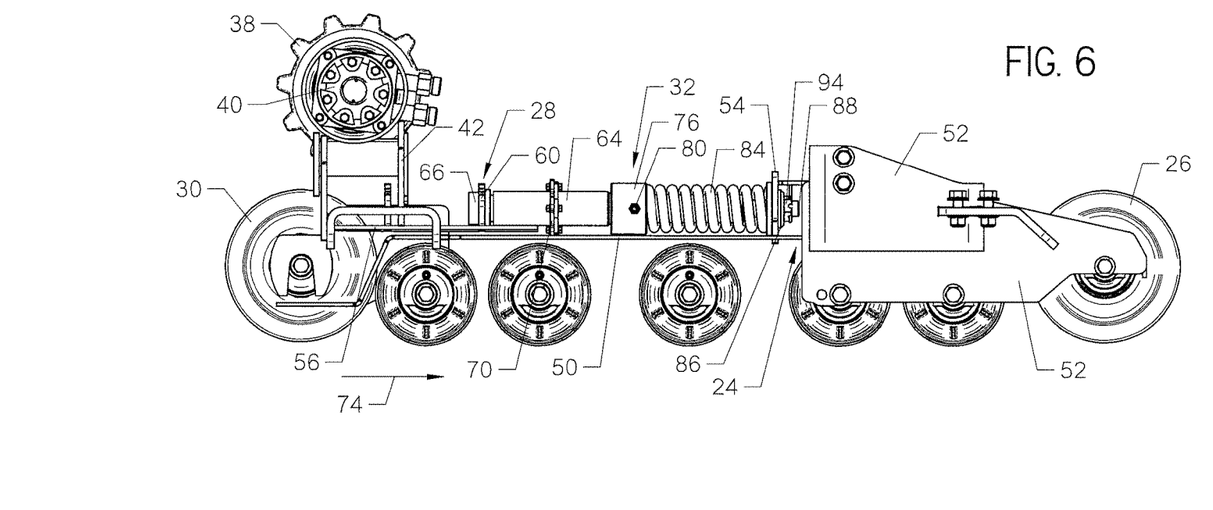
FIG. 6 is a side elevational view of the inner components of the track assembly shown in FIG. 2. Portions of the frames included in the track assembly have been removed for clarity.
Figure 7:
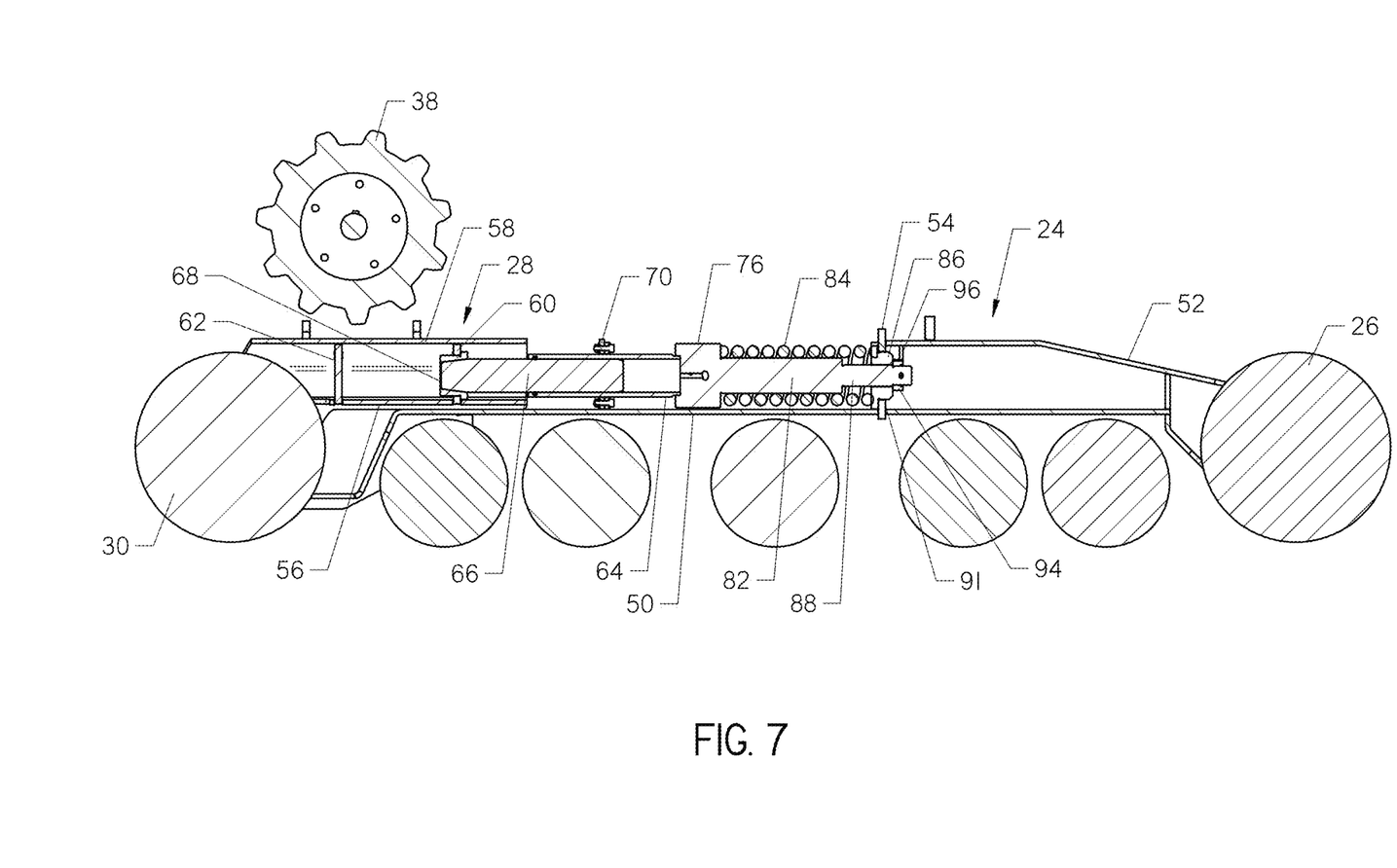
FIG. 7 is a cross-sectional view of the inner component of the track assembly shown in FIG. 5. Various portions of the frames included in the track assembly have been removed or added from those portions shown in FIG. 5.

Continuing with FIGS. 4-7, the second frame assembly 28 comprises a slide plate 56 supported above and in a spaced-relationship with the base frame 50. The rear roller 30 is attached to the slide plate 56 via an elongate cover bracket 58, shown in FIG. 4. The cover bracket 58 is situated below and in a spaced-relationship with the motor bracket 42. Front and rear brackets 60 and 62 are rigidly attached to and project from a top surface of the slide plate 56. The cover bracket 58 is rigidly attached to the slide plate 56 via the front and rear brackets 60 and 62 such that it forms a cover over the slide plate 56, as shown in FIGS. 4 and 7. The rear sides of the cover bracket 58 extend downwards and attach to opposite sides of the rear roller 30, as shown in FIG. 4.

The linear actuator 32 comprises a cylinder 64 housing a reciprocating piston 66. An end 68 of the piston 66 is rigidly attached to the slide bracket 56 via the front bracket 60, as shown in FIGS. 5-7. The cylinder 64 is supported on the base frame 50 by a cylinder bracket 70. In operation, extension of the piston 66 pushes the slide plate 56 rearwardly, as shown by arrow 72 in FIG. 5. Rearward movement of the slide plate 56 moves the rear roller 30 rearwardly towards the inner surface of the track 44. The more pressure applied to the track 44 by the rear roller 30, the greater the amount of tension applied to the track 44 by the rollers 26, 30, and 36. In contrast, retraction of the piston 66 within the cylinder 64 pulls the slide plate 56 forward, as shown by arrow 74 in FIG. 6. Forward movement of the slide plate 56 moves the rear roller 30 forward and away from the track 44, decreasing the amount of tension applied to the track 44 by the rollers 26, 30, and 36.

With reference to FIGS. 4-8, the linear actuator 32 further comprises a supply collar 76. The supply collar 76 comprises a grease zerk fitting 78, shown in FIGS. 4 and 8, and a fluid supply inlet 80. Hydraulic fluid is supplied to the linear actuator 32 shown in FIGS. 4-8 through the supply inlet 80. In alternative embodiments, the linear actuator may use pneumatic fluid. In further alternative embodiments, the linear actuator may be configured to receive electric power.

Figure 8:
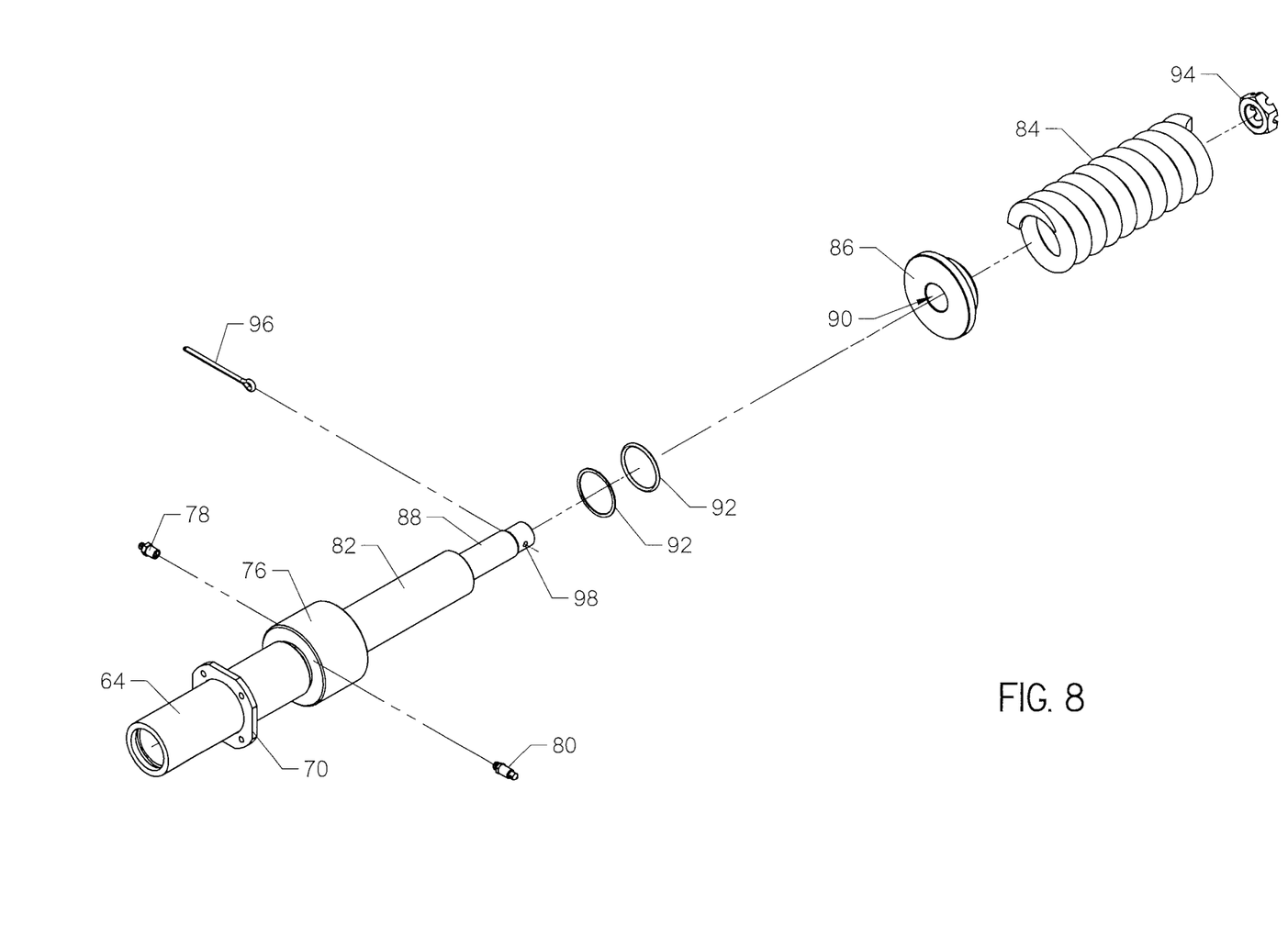
FIG. 8 is a perspective exploded view of the linear actuator shown in FIG. 2. The piston is not shown installed within the cylinder.

Continuing with FIGS. 7 and 8, the linear actuator 32 further comprises an elongate rod 82 attached to the supply collar 76 opposite the cylinder 64. A spring 84 is disposed around the rod 82 and positioned between the supply collar 76 and the tension plate 54, as shown in FIGS. 4-7. The spring 84 engages a circular spring cap 86 installed at least partially within a hole formed in the tension plate 54. A front end 88 of the rod 82 extends through a central passage 90 in the spring cap 86 such that the front end 88 projects from a front side 91 of the tension plate 54. One or more seals or wear rings 92, shown in FIG. 8, may be positioned between the spring 84 and the supply collar 76.

In operation, the rod 82 is movable relative to the tension plate 54 and spring cap 86. Removal of the rod 82 rearwardly through the tension plate 54 is prevented by a connector, such as a nut or screw cap 94 and a pin 96. The screw cap 94 engages the front side 90 of the tension plate 54 and is held on the rod 82 by installation of the pin 96 within a passage 98 formed in the front end 88 of the rod 82. When the spring 84 is relaxed, the screw cap 94 is held against the tension plate 54. Compression of the spring 84 pushes the rod 82 forward relative to the tension plate 54. Actual movement of the spring 84 and rod 82 may be minimal and not visible during operation. The spring 84 functions as a shock absorber during operation and helps maintain the tension applied to the track 44 via the rear roller 30 and linear actuator 32.

In alternative embodiments, the linear actuator 32 may not include the rod 82, the spring 84, and related components. Instead, the supply collar 76 may directly engage the tension plate 54, as shown for example in FIG. 12. In such case, the tension plate 54 may be positioned closer to the supply collar 76 than is shown in FIGS. 4-7. One or more spacers may also be positioned between the supply collar 76 and the tension plate 54 in such embodiment.

Turning to FIGS. 9 and 10, the power source 34 is a pump 100 in fluid communication with a hydraulic manifold 102. The pump 100 and manifold 102 are supported on the frame 20 within the engine compartment 18 and between the track assemblies 12 and 14. The pump 100 may comprise any number of hydraulic pumps known in the art. For example, the pump may comprise a fixed displacement or variable displacement pump and valve or a hydrostatic pump.

In the embodiments shown in FIGS. 9 and 10, a single pump 100 is used to supply fluid to the left and right motors 40 included in each track assembly 12 and 14. The pump 100 is operable in forward and reverse to drive movement of each track assembly 12 and 14. When only a single pump 100 is used, the pump 100 and the left and right motors 40 communicate on a single hydraulic circuit.

In alternative embodiments, the work machine to may comprise a left and right pump 100, each pump 100 on a separate hydraulic circuit. Thus, the left pump too and left motor 40 may communicate on a left hydraulic circuit, while the right pump 100 and right motor 40 may communicate on a right hydraulic circuit. If the work machine to comprises a left and a right pump 100, only one of the pumps too may communicate with the manifold 102. Alternatively, the manifold 102 may communicate with both pumps too and both ground drive circuits.

Figure 11:
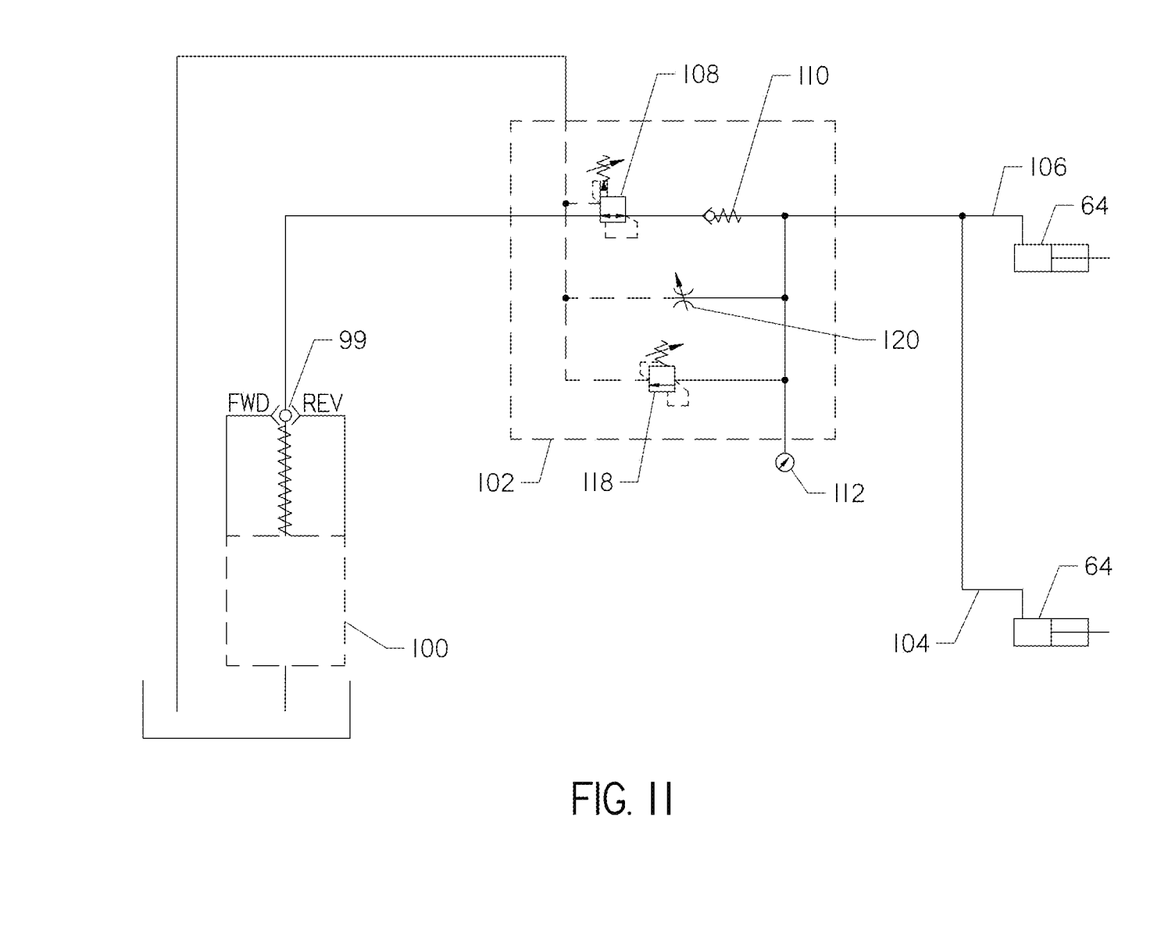
FIG. 11 is a hydraulic circuit map of one embodiment of a hydraulic circuit used with the track tensioning system disclosed herein.

With reference to FIG. 11, one embodiment of a hydraulic circuit used with the work machine 100 is shown. A single pump 100 is shown in communication with a single manifold 102. In addition to supplying fluid to the left and right motors 40, the pump 100 also supplies fluid to the manifold 102. The amount of pressure required to maintain track tension is usually less than that required to drive the ground drive motors 40. Fluid from the pump 100 is supplied to the manifold 102 using a shuttle valve 99. The shuttle valve 99 allows fluid to be supplied to the manifold 102 when the pump 100 is powering the track assemblies 12 and 14 in a forward or reverse direction. Without the shuttle valve 99, fluid is only be supplied to the manifold 102 when the track assemblies 12 and 14 are moving in a forward direction.

Continuing with FIG. 11, the manifold is configured to supply fluid to the left and right cylinders 64 included in each track assembly 12 and 14 to maintain track tension. The manifold 102 supplies hydraulic fluid to each track assembly 12 and 14 via a left and right hose 104 and 106, as shown in FIGS. 9 and 11. Each hose 104 and 106 is attached to a corresponding supply inlet 80 on the corresponding linear actuator 32.

The manifold 102 comprises a proportional pressure reducing valve (PPRV) 108. The valve 108 reduces the rate at which fluid from the pump 100 flows into the hoses 104 and 106. The valve 108 supplies a continuous flow of fluid from the pump too into the hoses 104 and 106 so long as the pump 100 is supplying fluid to the manifold 102. The pump 100 only supplies fluid to the manifold 102 when the work machine 10 is moving in a forward or reverse direction. If the work machine 10 is off or in neutral, no fluid is supplied to the manifold 102. Thus, the valve 108 operates in two modes. In a first mode, the valve 108 supplies fluid into the hoses 104 and 106. In a second mode, the valve 108 does not supply fluid into the hoses 104 and 106.

Fluid from the hoses 104 and 106 flows into the corresponding cylinders 64 and extends the corresponding pistons 66 a desired distance. Such action may be referred to as "charging" the cylinders 64 to the desired pressure. The cylinders 64 are only charged when the work machine 10 is moving. The desired pressure for the cylinders 64 may correspond with the rate of fluid flow from the PPRV 108 and into the hoses 104 and 106. The flow rate of fluid supplied to the hoses 104 and 106 may vary depending of the specifications of the chosen proportional pressure reducing valve 108. For example, larger track assemblies may require a higher rate or fluid flow than smaller track assemblies to maintain the desired track tension.

Fluid passing through the valve 108 and towards the cylinders 64 is prevented from flowing in reserve back towards the valve 108 by a check valve 110, as shown in FIG. 11. Absent the check valve 110, anytime the pump 100 is off or in neutral or at low pressure, the cylinders 64 would lose pressure. The check valve 110 thus maintains the set pressure on the cylinders 64.

Turning back to FIGS. 4 and 6, the set flow rate of fluid into the cylinders 64 may correspond with a desired position of the rear roller 30 relative to the first frame assembly 24. The desired position of the rear roller 30 may be tracked and monitored by viewing a position of a bolt 114 attached to the rear roller 30 relative to a window 116 formed in the motor bracket 42, as shown in FIGS. 2 and 3. As the rear roller 30 moves, the bolt's 114 position moves axially within the window 116. The desired value for the hydraulic pressure may correspond with the desired position of the bolt 114 within the window 116. The desired value may also correspond with a set position of the piston 66 relative to the cylinder 64.

Continuing with FIG. 11, the manifold 102 further comprises a high pressure relief valve 118. In operation, if too much fluid pressure is applied to the track 44, the high pressure relief valve 118 opens, drawing fluid away from the hoses 104 and 106 and the corresponding cylinders 64. When fluid is drawn from the cylinders 64, the pistons 66 retract, releasing tension on the tracks 44. For example, if the work machine 10 is driven over a curb, the compression of the rubber tracks against the curb may cause a sudden spike in pressure within the cylinder 64. To allow for shock absorption and prevent damage to the tracks 44 or cylinders 64, the spike in pressure is relieved by the high pressure relief valve 118. Once the obstacle is traversed, fluid flowing through the PPRV 108 recharges the cylinders 64 to the desired pressure.

In alternative embodiments, the proportional pressure reducing valve 108 may include a spring loaded check valve configured to divert fluid away from the hoses 104 and 106 in the event of a pressure spike.

In operation, fluid is continuously supplied to the cylinders 64 if the work machine 10 is moving. Any spikes in pressure are released via the high pressure valve 118. The cylinders 64 subsequently recharge upon movement of the work machine 10. Thus, the track tensioning system disclosed herein maintains optimum track tension during operation without manual manipulation of the linear actuators 32 by an operator.

The manifold 102 further comprises a manual valve 120. An operator may open the valve 120, as needed, to relieve pressure within the cylinders 64 and reduce tension on the tracks 44. Relieving track tension may be necessary to perform maintenance on the track assemblies 12 and 14 or to replace worn tracks 44. Once maintenance is completed or new tracks 44 are mounted, the cylinders 64 are recharged by driving the working machine 10 in the forward or reverse direction.

In the embodiment shown in FIGS. 9-11, a single manifold 102 is used to control the amount of fluid delivered to both track assemblies 12 and 14. Thus, the desired value for tension applied to the tracks 44 is identical for both assemblies 12 and 14. In alternative embodiments, the work machine 10 may comprise a right and a left manifold 102. The right and left manifold 102 may each communicate with a single pump 100. Alternatively, if two pumps 100 are used, each manifold 102 may communicate with a corresponding left and right pump 100. If two manifolds 102 are used, the track assemblies 12 and 14 may be set to different track tensions. For example, PPRV's 108 having different set flow rates may be used with the track assemblies 12 and 14.

Continuing with FIG. 11, the manifold 102 may further comprises a pressure gage 112. The pressure gage 112 monitors the amount of hydraulic fluid being fed into the left and right hoses 104 and 106 and the corresponding cylinders 64. The pressure gage 112 may communicate with a controller included in the work machine's operator station 16.

In an alternative embodiment, an electronic valve may be used with the track tension system. The electronic valve may communicate with a controller in communication with the pressure gage and the work machine's hydraulic circuit. The controller may open or close the electronic valve as needed to control the rate of fluid supplied to the cylinders.

In such embodiment, the controller may be programmed with preset pressure values to maintain optimum track tension. Alternatively, a desired pressure value for the track tension may be set by an operator on an interface included in the operator station 16 or positioned remote from the work machine 10. The operator may vary the desired value as needed based on the current work conditions. Thus, such track tension system may automatically maintain a desired tension of the track during operation without operator intervention.

The linear actuator 32 disclosed herein is single acting. In alternative embodiments, the linear actuator may be double acting so that pressure applied to the piston can be increased or reduced automatically. Thus, fluid delivered to the cylinders could be reduced without the use of the high pressure relief valve or manual opening of the flow control valve. In such case, the manifold may include a two-way valve configured to deliver or draw fluid away from the hoses as directed by the controller.

In alternative embodiments, the manifold may be a pneumatic manifold in communication with a pneumatic pump. Like the hydraulic manifold 102, the pneumatic manifold may include a valve configured to operate in two modes: a first mode where pneumatic fluid is supplied to the cylinder, and a second mode where no pneumatic fluid is supplied to the cylinder. A controller in communication with the valve would toggle the valve between the first and second modes. The pneumatic manifold would also comprise a manual flow control valve and a high pressure relief valve.

In further alternative embodiments, an electric circuit may be used in place of the manifold. The circuit may be configured to supply various levels of power to the cylinder, extending the piston as desired. A controller in communication with the circuit may be configured to manipulate the amount of power supplied to the cylinder, as needed to maintain the desired tension on the track. For example, the controller may be configured to maintain the piston extended from the cylinder a set distance.

If desired, the hoses 104 and 106 may be disconnected from or stopped from supplying fluid to the corresponding left and right linear actuators 32. In such instance, the operator may manually extend the piston 66 by supplying grease to the cylinder 64 using the grease zerk 78, as shown in FIG. 4. If tension on the track 44 decreases during operation, more grease may be supplied to the cylinder 64, as needed.

Figure 12:
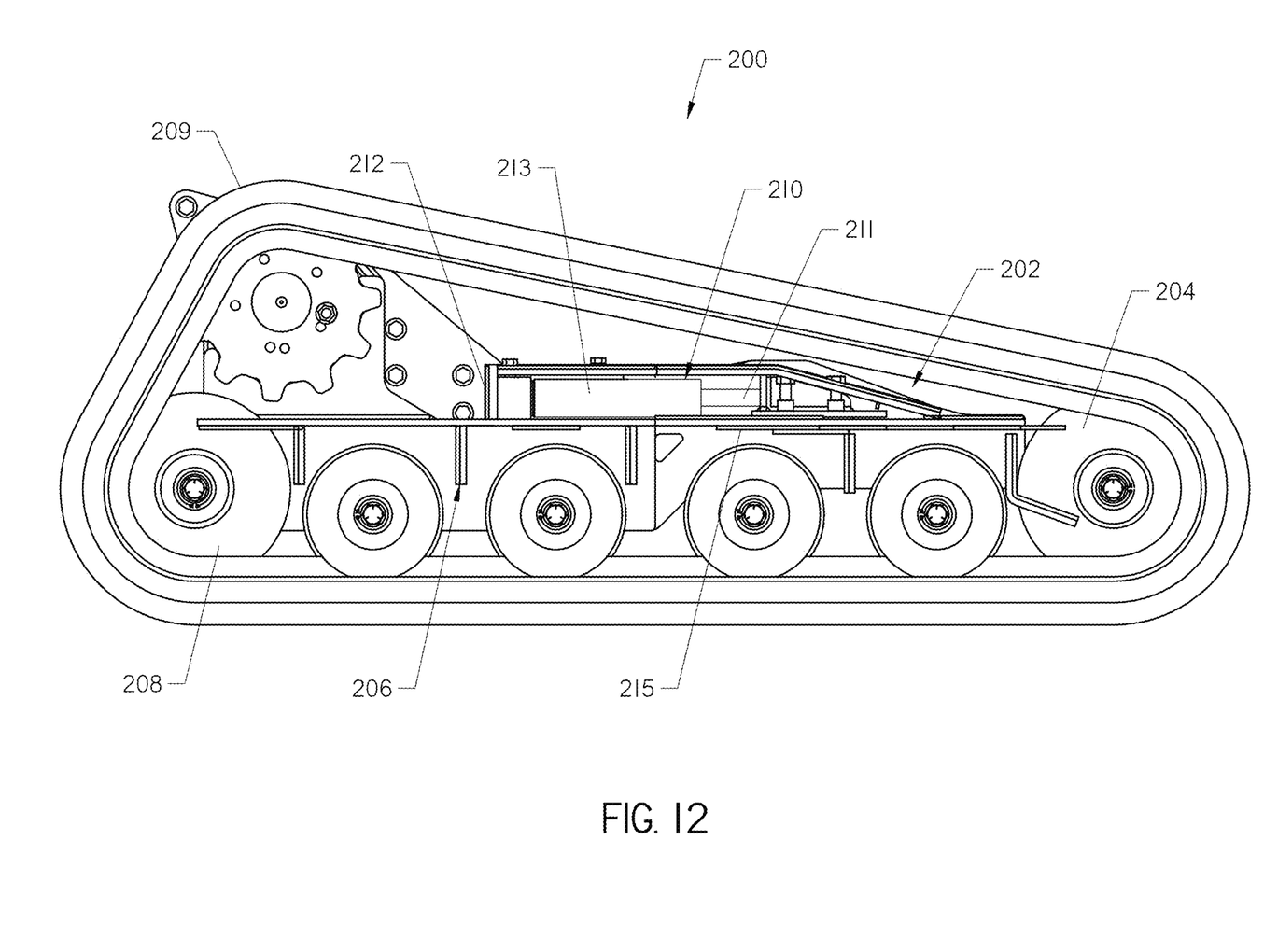
FIG. 12 is a side elevational view of another embodiment of a track assembly.

Turning to FIG. 12, an alternative embodiment of a track assembly 200 is shown. The track assembly 200 is like the track assembly 12, with a few exceptions. The track assembly 200 comprises a first frame assembly 202 supporting a front roller 204 and a second frame assembly 206 supporting a rear roller 208. The frame assemblies 202 and 206 and rollers 204 and 208 are surrounded by an endless track 209.

In contrast to the track assembly 12, the first frame assembly 202 is movable relative to the second frame assembly 206 using a linear actuator 210. The linear actuator 210 comprises a piston 211 installed within a cylinder 213. The piston 211 is rigidly attached to a slide plate 215 of the first frame assembly 202.

In contrast to the track assembly 12, the front roller 204 applies tension to the track 209 in the track assembly 200, rather than the rear roller 208. The track assembly 12 shown in FIGS. 2 and 3 may likewise be constructed so that the front roller 26 moves in response to movement of the linear actuator 32 rather than the rear roller 30.

Continuing with FIG. 12, the linear actuator 210 does not utilize a spring, like the spring 84, shown in FIG. 5. Rather, the linear actuator 210 is connected directly to a tension plate 212. The frame assemblies 202 and 206 have varying construction from those shown in FIGS. 2-7, however, the frame assemblies 202 and 206 both function in the same manner as the frame assemblies 12 and 14 described above.

The various features of the track tensioning system described herein may have different sizes, shapes, or constructions than those specifically described herein, so long as the system functions as described herein.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

The invention claimed is:

1. An apparatus, comprising:
a work machine supported on a pair of track assemblies, each track assembly comprising:
a first frame assembly supporting a first roller;
a second frame assembly supporting a second roller and movable relative to the first frame;
an endless track surrounding the first and second frames and engaging the first and second rollers; and
a linear actuator engaging the first and second frames and configured to receive hydraulic fluid, the linear actuator comprising:
a supply collar interposed between a cylinder and an elongate rod; and
a reciprocating piston disposed within the cylinder and engaging the second frame assembly; and
a manifold supported on the work machine and in fluid communication with the linear actuator and a pump, the hydraulic manifold comprising:
a valve configured to supply fluid from the pump to the linear actuator at a desired flow rate to maintain fluid within the linear actuator at a desired pressure.

2. The apparatus of claim 1, in which the valve is operable in a first mode, in which fluid from the pump is provided to the linear actuator, and in a second mode, in which fluid is not provided to the linear actuator.

3. The apparatus of claim 2, in which the second frame moves away from the first frame when the valve is in the first mode, increasing tension applied to the endless track.

4. The apparatus of claim 1, in which the valve is a first valve, the manifold further comprising:
a second valve configured to draw fluid away from the linear actuator if pressure within the linear actuator exceeds the desired pressure.

5. The apparatus of claim 2, in which the work machine is moving when the valve is the first mode, and in which the work machine is not moving when the valve is in the second mode.

6. The apparatus of claim 1, in which the valve only supplies fluid to the linear actuator when the work machine is moving in a forward or a reverse direction.

7. The apparatus of claim 1, in which the first roller is supported at the front of the track assembly and the second roller is supported at the rear of the track assembly when the work machine is facing a forward path of travel.

8. The apparatus of claim 2, in which the linear actuator comprises:
a spring disposed around the elongate rod and engaging the first frame assembly.

9. The apparatus of claim 8, in which the spring is interposed between the supply collar and a plate supported on the first frame assembly; and in which the elongate rod is disposed within a hole formed in the plate and is reciprocally movable relative to the plate.

10. The apparatus of claim 8, in which the second frame assembly comprises a slide plate interconnecting the second roller and the piston.

11. The apparatus of claim 8, in which the piston extends from the cylinder when the valve is in the first mode, applying pressure to the second frame and compressing the spring.

12. A track assembly, comprising:
a first frame assembly supporting a first roller;
a second frame assembly supporting a second roller and movable relative to the first frame assembly;
an endless track surrounding the first and second frame assemblies and engaging the first and second rollers; and
a linear actuator engaging the first and second frame assemblies, the linear actuator comprising:
a supply collar interposed between a cylinder and an elongate rod; and
a piston disposed within the cylinder and engaging the second frame assembly, the piston extendable to a set position;
in which the linear actuator is configured to communicate with a power source, the power source configured to manipulate the amount of power supplied to the linear actuator to maintain the linear actuator at the set position while the track assembly is in motion.

13. The track assembly of claim 12, in which the power source is a hydraulic manifold in communication with a hydraulic pump.

14. The track assembly of claim 13, in which the hydraulic manifold comprises a valve, the valve operable in a first mode, in which fluid from the hydraulic pump is provided to the linear actuator, and in a second mode, in which fluid is not provided to the linear actuator.

15. The track assembly of claim 12, in which the linear actuator is hydraulically powered.

16. The apparatus of claim 12, in which the linear actuator comprises:
a spring disposed around the elongate rod and engaging the first frame assembly.

17. A work machine, comprising:
a frame; and
the track assembly of claim 12 supported on the frame;
in which the power source is supported on the frame.

* * * * *

UNITED STATES PATENT AND TRADEMARK OFFICE
CERTIFICATE OF CORRECTION

PATENT NO. : 12,221,180 B2
APPLICATION NO. : 17/502725
DATED : February 11, 2025
INVENTOR(S) : Kukuk et al.

Page 1 of 1

It is certified that error appears in the above-identified patent and that said Letters Patent is hereby corrected as shown below:

In the Specification

Column 2, Line 46, please delete "to" and substitute therefor "10".
Column 5, Line 10, please delete "to" and substitute therefor "10".
Column 5, Line 12, please delete "too" and substitute therefor "100".
Column 5, Line 15, please delete "to" and substitute therefor "10".
Column 5, Line 16, please delete "too" and substitute therefor "100".
Column 5, Line 18, please delete "too" and substitute therefor "100".
Column 5, Line 21, please delete "100" and substitute therefor "10".
Column 5, Line 32, please delete "be".
Column 5, Line 46, please delete "too" and substitute therefor "100".
Column 5, Line 63, please delete "of" and substitute therefor "on".
Column 7, Line 4, please delete "comprises" and substitute therefor "comprise".
Column 7, Line 4, please delete the first occurrence of "gage" and substitute therefor "gauge".
Column 7, Line 4, please delete the second occurrence of "gage" and substitute therefor "gauge".
Column 7, Line 7, please delete "gage" and substitute therefor "gauge".
Column 7, Line 12, please delete "gage" and substitute therefor "gauge".

Signed and Sealed this
Eighteenth Day of March, 2025

Coke Morgan Stewart
*Acting Director of the United States Patent and Trademark Office*